United States Patent Office

3,843,517
Patented Oct. 22, 1974

3,843,517
METHODS FOR ELIMINATION OF OIL SLICKS
Robert W. McKinney, Adelphi, Md., Andrew L. Dixon, Jr., Wickliffe, Ohio, and Raymond L. Jordan, Baltimore, Md., assignors to W. R. Grace & Co., New York, N.Y.
No Drawing. Continuation-in-part of abandoned application Ser. No. 1,512, Jan. 8, 1970. This application Dec. 17, 1970, Ser. No. 99,253
Int. Cl. C02b 9/02
U.S. Cl. 210—11
10 Claims

ABSTRACT OF THE DISCLOSURE

In a preferred mode, cultures containing hydrocarbon and oil consuming microorganisms with or without nutrients are adsorbed in a carrier such as clays, vermiculites, silica gels, perlites and similar materials and freeze-dried to form useful compositions. These compositions are placed on oil films or layers which are on fresh or salt water, or on beaches or river banks, or in storage tanks, ships tanks and so on. The carrier adsorbs and concentrates the oil in the presence of the microorganisms and the microorganisms consume the oil. The microorganisms remain viable in these compositions even after long storage periods. In an alternative composition, the microorganisms may be freeze-dried and then admixed with a carrier such as clays, vermiculites, perlites, silica gels or so on.

Cross-Reference To Related Application

This application is a continuation-in-part of our application U.S. Ser. No. 1,512, filed Jan. 8, 1970, now abandoned.

Background of the Invention

This invention relates to oil and hydrocarbon consuming compositions useful for eliminating oil contamination from shorelines and fresh and saline waters. This invention further relates to methods for producing these oil and hydrocarbon consuming compositions as well as methods for their use. This water on which the deleterious oil and hydrocarbons are present may be that of streams, rivers, lakes, bays, oceans or contained water such as bilge water, tank water, tanker ballast water and so on. In particular, it relates to freeze-dried microorganism compositions and the use of these compositions to consume and remove oils and hydrocarbons.

The conventional methods that are presently used for removing oil from water involve spreading adsorbent materials such as straw, clay, silica or kieselguhr particles, filaments, etc., onto the oil slicks. These materials may optionally be coated with an oleophilic agent. When placed on the oil, these materials absorb the oil. Some materials, such as straw, continued to float after absorbing oil. These materials are removed from the water surface by hand. Other materials sink after absorbing oil due to the increased specific gravity. Techniques for elimination of oil by sinking it leave masses of oil and hydrocarbons on the bottom of bodies of water. Furthermore, it has been shown that after several months under water, the sunken mass is still mobile and oil could be released from it by agitation. The sunken oil could also foul fishing gear and sinking cannot be done in the vicinity of beds of oysters or other shellfish. The compositions and methods of this invention solve this problem of oil removal by having microorganisms digest the oil to harmless waste products, thereby removing the oil. In the present invention, freeze-dried microorganisms, mixtures of these microorganisms and composites of these microorganisms are conveniently stored and spread on oil slicks to digest these slicks when such an emergency arises. The oil slick is then rapidly digested to essentially carbon dioxide and water, effectively dissipating the pollution.

In the prior art, microorganisms have been used to convert oil to protein. For example, U.S. Pat. No. 2,769,750 discloses admixing particulate anhydrous inert adsorbents with hydrocarbons and/or oxygenated hydrocarbons. This homogeneous mixture is further mixed with a nutrient inoculated with hydrocarbon-consuming microorganisms. The adsorbents are normally added in sufficient amounts so that the adsorbent hydrocarbon mixture is a dry powder. The adsorbents are preferably naturally occurring clays, such as kaolinic clay. Further bacterial cultures have been freeze-dried, one technique being disclosed in U.S. Pat. No. 3,261,761. That process involves growing a culture in the presence of a metal salt such as NaCl; diluting the culture with buffer and sugar solutions; pre-cooling it to 0° C. to 1° C., reducing its temperature to −5° C. or lower by applying a vacuum and subliming off the moisture by maintaining it at −5° C. or below. Concerning other techniques of drying microorganisms, U.S. Pat. No. 2,919,194 discloses suspending fine particles of wet yeast in a liquid and drying the suspended yeast by evaporating the water. The water evaporation is done by contact with a stream of inert gas. This patent teaches this type of drying as preferred when yeast cells are being procesed. U.S. Pat. No. 3,224,946 relates to the use of synthetic or natural zeolites in microbial conversion of hydrocarbons to other products. The hydrocarbons are absorbed on the molecular sieves or within their crystalline pore structure. The hydrocarbon containing zeolites are contacted with the water containing the necessary nutrients and hydrophilic microbes are added. This allows the microbes to retain contact with its nutrient source and yet attack the hydrocarbons. It can readily be appreciated that there would be extreme difficulties in using this system to eliminate oil slicks on large, open bodies of water, if it could be used in that manner at all. To further illustrate the unpredictability of such a use, the patent discloses that asbestos and bentonite failed to perform as the zeolite.

It is an object of this invention to dissipate oil and similar hydrocarbon pollution by digesting these oils and hydrocarbons with microorganisms.

It is further an object of this invention to set out microorganism compositions which can be stored for long periods of time, but which when spread on an oil or similar hydrocarbon surface are rapidly activated and effectively remove this surface.

It is also an object of this invention to set out freeze-dried microorganism compositions which are storable for long periods of time, are easily dispersed on an oil or hydrocarbon surface, and which are readily activated.

It is additionally an object of this invention to set out methods for removing oil and similar hydrocarbon slicks from rivers, lakes, streams, bays, oceans, shorelines, land areas, or from contained waters such as that in tanks and so on.

And further, it is an object of this invention to set out a unique use of the compositions of this invention in crude oil tanker operations, whereby not only is pollution from this source abated, but operational safety is increased.

Brief Description of the Invention

This invention comprises compositions and methods for removing oils and other hydrocarbons from surfaces such as shorelines and those of fresh and salt water, whether contained or essentially open. The fresh and salt water surfaces may be those of natural or man-made bodies of water or water contained in tanks or other containers. The compositions preferably comprise freeze-drying, (i) microorganisms along with nutrients, or (ii) microorganisms within a carrier material, or (iii) microorganisms within a carrier also containing nutrients. Alternatively, freeze-dried microorganisms may be admixed with a carrier material which may or may not contain nutrients. For removal of a hydrocarbon or oil, any of these compositions, or a mixture, is placed on the hydrocarbon or oil deposit to be removed. The oil or hydrocarbon is then digested by the microorganisms.

Detailed Description of the Invention

The process of this invention for preparing freeze-dried cultures of hydrocarbon consuming microorganisms involves preparing a culture, which is an aqueous medium suitable for growing and sustaining hydrocarbon-consuming microorganisms. This culture, or a culture mixture, is then preferably either free-dried, or adsorbed on and in a carrier, optionally along with nutrients, and freeze-dried. In use, the composition is dispersed onto the oil or hydrocarbon surface with the microorganisms digesting and removing this oil and hydrocarbon.

The hydrocarbon consuming or converting microorganisms useful in this invention include hydrocarbon consuming or converting bacteria, molds, yeast, fungi and actinomyces. The terms "oil consuming" and "hydrocarbon consuming" are used interchangeably and are meant to encompass all of the compounds and compositions encompassed within the terms commonly known as "oil," "crude oil," "gas oil," "hydrocarbons," and "petroleum." Examples of specific useful species of microorganisms are: *Pseudomonas aeruginosa, Pseudomonas boreopolis, Pseudomonas fluorescens, Pseudomonas syringal, Pseudomonas natriegens, Pseudomonas oleovorans, Methanomonas methanica, Desulfovibrio desulfuricans, Micrococus paraffinae, Achromobacter agile, Achromobacter centropunctatum, Bacterium aliphaticum, Bacterium benzoli, Bacterium hidium, Bacterium naphtha linicus, Bacillum amylobacter, Bacillus megaterium, Bacillus subtilis, Bacillus hexacarbovorum, Bacillus tolulicum, Mycobacterium album, Mycobacterium rubrum, Mycobacterium lacticola, Nocardia opacus, Nocardia corallina, Nocardia farcinica, Actinomyces oligocarbophilus, Candida pulchenine, Candida utiliz, Candida tropicolis, Candida lipolytica.* Various species of Debaryomyces, Endomyces, Hansenia, Monillia, Oidila and Torulopis are also useful, as also are mixtures of various microorganisms. The sole restriction on the type of microorganism is that only nonpathogenic microorganisms should be used.

A single microorganism species does not have the ability to continue all the various types of chemical compounds present in oil or any complex hydrocarbon mixture containing, for example, aliphatic, cyclic, aromatic and olefin compounds or compounds of a wide range of molecular weight or mixtures of various types of compounds of widely ranging molecular weights. Therefore, a mixture of microorganisms is selected which will contain species capable of consuming all the major components of the oil or hydrocarbon samples. Either known data or preferably, separate selective analyses are used to develop the combinations of microorganisms which have the ability to consume the major components of the oils and hydrocarbons.

The preferred carrier materials when used include clays such as kaolin, zeolites and other microporous silica-alumina materials, silica gels, vermiculites and perlites, and particularly these in hydrophilic forms. The operable materials, however, include microporous materials of the class into which microorganisms and nutrients or microorganisms alone can be absorbed and freeze-dried, and which will subsequently adsorb oil so as to bring this oil into a close relationship with the microorganisms for digestion. A particularly preferred material is vermiculite and ideally an unexfoliated vermiculite. Vermiculite as used herein refers to the group of rock-forming mineral species characterized by a layer of latticized structure in which the silicate-layer units have a thickness of approximately 10 A. (Angstrom units). The main elements present in the layer are magnesium, aluminum, silica, iron and oxygen with the latter being separated by one or two sheets of water molecules associated with cations, such as magnesium, calcium, sodium and hydrogen. The layers have considerably lateral extent relative to the thickness of the basic 10-Angstrom-unit layer. Further, vermiculite belongs to the phyllosilicate group, which are characterized by the presence of Si-O sheets formed by the linkage of three corners of each $SiO_4$ tetrahedron to neighbors so that each tetrahedron has three shared and one free oxygen. The type formula is $Am(B_2X_5)_n$. Vermiculite has monoclinic hexagonal plates and a hardness of one. The term "vermiculite" as used herein therefore includes minerals consisting wholly or largely of vermiculite, or minerals of a mixed-layer type containing vermiculite layers as an important constituent, such as hydrobiotites and chlorite-vermiculites. Unexfoliated vermiculite is an unexpanded vermiculite. For very effective use, the pore diameters of the microporous carriers should be in the range of 10 A. or greater, although smaller pore sizes in the range of 5 A. can be used. In regard to particle size, this is not a critical factor, with sizes of from within the micron range up to a centimeter being useful. The particle size will be dependent to a degree on the particular microporous carrier being used, that is, for example, it will be different for an exfoliated and an unexfoliated vermiculite.

The terms oil, petroleum and hydrocarbons encompass generically all of the hydrocarbons and oxygenated hydrocarbons, singly and in combinations, and particularly those found in naturally occurring substances known as crude oils, gas oils and petroleums. Therefore, the terms cover complex mixtures of paraffin, oleffinic, acetylenic, carbocyclic and aromatic hydrocarbons. These terms further cover this generic class of substances regardless of the geographic origin or source of the substances. For simplicity, the terms oil and hydrocarbons, equivalents for purposes of this disclosure, will be used together and interchangeably to denote the above generic class of substances.

The term "nutrients" as used herein comprises those inorganic substances which the microorganisms require for growth and activity. These same nutrients are generally present in the microorganism culturing solutions. Table 1 sets out a list of common nutrients and several solutions of these substances. Those set out are exemplary of useful nutrient solutions, but are by no means exclusive. Other solutions of these substances, as well as solutions containing other substances, can be used to form the nutrient media.

TABLE I

| Bacterial nutrients | Bacteria nutrients, g. | | | Yeast nutrient solution, g. |
|---|---|---|---|---|
| | Solution 1 | Solution 2 | Solution 3 | |
| Potassium monohydrogen phosphate | 1.0 | 2 | 7 | |
| Sodium chloride | 1.0 | | 0.1 | |
| Magnesium sulfate | 0.5 | 0.20 | 0.2 | 0.65 |
| Ferric sulfate | 0.010 | 0.005 | | 0.068 |
| Copper sulfate | 0.001 | | | |
| Zinc sulfate | 0.001 | | | 0.17 |
| Manganese sulfate | 0.001 | 0.002 | | 0.045 |
| Sodium carbonate | | 0.1 | | |
| Ferrous sulfate | | | | 0.068 |
| Calcium chloride | | 0.1 | | |
| Ammonium chloride | | | 2.5 | |
| Potassium chloride | | | | 2 |
| Ammonium phosphate | | | | 2 |
| Distilled water | 1,000 | 1,000 | 1,000 | 1,000 |

The compositions for practical use in consuming (digesting) oils and hydrocarbons require that the microorganisms be in a suitable form for storage, handling and use. The general method for producing these microorganisms is to culture them in an aqueous nutrient media. However, it is not feasible to store, handle or use them as an aqueous media. In solving this problem, a freeze-drying is used to put the microorganisms in a suitable form. Therefore, considered as parts of the concept of this invention, (*i*), the microorganisms may be freeze-dried alone, (*ii*) freeze-dried along with nutrients, (*iii*) freeze-dried alone and then admixed with a carrier which may contain nutrients, (iv) adsorbed into a carrier and freeze-dried, (v) or adsorbed into a carrier along with nutrients and then freeze-dried. The actual stepwise techniques of freeze-drying are known in the art and are not a separate part of this invention. In essence, freeze-drying as known in the art and used herein comprises concentrating a solution of the material to be dried as far as possible, decreasing its temperature to form 1° C. to 5° C. below its solidification point, drawing a vacuum and evaporating the solvent directly from the solid to gaseous phase as by sublimation. During this sublimation, the temperature drops about 5° C. to 50° C. Terms other than freeze-drying used many times to describe this process are lyophilization or vacuum sublimation. Any commercially available freeze-drying apparatus may be used such as equipment manufactured by the Vertis Company, Inc., Vacudyne Corporation, Thermovac Industries Corporation or the Hull Corporation. After the material has been thoroughly dried, the temperature may be increased up into the range of room temperature or above, but preferably the previously freeze-dried material is maintained within a desiccant atmosphere. The temperature should not, however, be raised up to a point where the microorganisms would be destroyed.

Optionally, in the process of freeze-drying an organic colloid may be added to the microorganism culture prior to the lowering of the temperature to minus 1° C. to minus 5° C. Organic colloids apparently protect such cultures during freeze-drying. Although any of the commonly used organic colloids may be used, whole skim milk is excellent for this purpose due to its ready availability, convenience, and excellent results.

A very suitable technique for storage is to place the microorganism compositions into containers containing a desiccant such as silica gel and vacuum seal these containers. These freeze-dried materials may then be stored for at least about 12 months, and where desiccated conditions are well maintained, for considerably longer periods of time.

When the microorganism above is freeze-dried, the microorganism is separated from the culture solution, optionally washed, and freeze-dried from an aqueous mixture, preferably a mixture which is maintained at a pH of from about 5-8. In the instance of freeze-drying along with nutrients, the microorganism is freeze-dried essentially along with a solution as set out in Table I which contains the necessary growth nutrient. The pH of this solution should preferably be maintained at from about 5 to 8. These nutrients may be added to the culturing solution prior to freeze-drying, or as a still further embodiment the microorganism may be removed from the culturing solution, optionally washed, mixed into a nutrient solution, and freeze-dried. When the microorganism is freeze-dried already adsorbed into a carrier, the process comprises admixing the carrier with a microorganism solution, allowing a period of from about 0.1 to 1 hour for adsorption, and after adjusting the pH to the preferred range of 5 to 8, freeze-drying. In the instance of freeze-drying a composition of the carrier microorganism and nutrients, the adsorption of the microorganism and nutrients may be carried out simultaneously or in any order, followed by the freeze-drying of the composite. Also in this instance, it is preferred to freeze-dry from a solution of about 5 to 8 pH. The useful buffer solutions of pH 5 to 8 are aqueous mixtures of potassium dihydrogen phosphate or potassium monohydrogen phosphate or mixtures of these compounds. Some useful buffer solutions are set out in Table II.

TABLE II

| | pH 6 | pH 7 | pH 8 |
|---|---|---|---|
| Potassium dihydrogen phosphates, g | 1.8 | 4.0 | 0.75 |
| Potassium monohydrogen phosphate, g | 8.2 | 13.6 | 16.4 |
| Water, g | 1,000 | 1,000 | 1,000 |

The use of these microorganism compositions for dissipating oils and other hydrocarbons consists essentially of dispersing the freeze-dried microorganism composition on the hydrocarbon or oil surface. The actual technique used for dispersing on the hydrocarbon or oil surface is not critical and any method which will essentially uniformly spread a layer on the surface can be used. This may be by dispersing as a dry powder or as an aqueous mixture; and can be accomplished by pneumatic spraying as a gas-solid mixture or hydraulic spraying as a liquid-solid mixture, or by the use of explosive dispersing charges similar to those used in emergency dye markers, and so on. Once on the surface of the oil, the microorganism composition, if applied in dry form, is activated by the readily available surrounding moisture and digestion of the oils and other hydrocarbons commences. The compositions which consist of the microorganisms and nutrients within a carrier are especially preferred, and have yielded the faster rates of digestion and dissipation of the oils and hydrocarbons.

The specific uses of these compositions are manyfold. They can be used on any polluting or otherwise unwanted hydrocarbon or oil surface, and this hydrocarbon or oil may be of any layer thickness. However, these are particularly useful for removing oil along the shorelines and in harbors where present manual techniques are very ineffective. Using present techniques such as straw adsorption, it is difficult to gather up the oil around pier pilings, in swamps or treed areas, or in other heavy undergrowth areas. But using the present invention, the microorganisms may be dispersed from boats, aircraft, or from manually carried containers for complete digestion and dissipation of the oil. Once dispersed on the oil, the microorganisms essentially immediately start to dissipate the oil, evolving carbon dioxide and water as principal waste products, and utilizing the oil and hydrocarbon as the protein carbon source for the formation and growth of more microorganisms. This microorganism growth allows for growth across the oil and hydrocarbon layer so that activity is not restricted solely to the area of the microporous carrier loaded particles.

Another important use of these compositions is in removing oil residues and sludges from tanks. These can be land anchored storage tanks prior to cleaning or repairing, or the tanks of tanker ships which transport crude oils. The particular advantage in tanker operation comes as a result of the procedure of taking in water for ballast for a return trip to an oil field area to reload with crude oil. The present technique is to dump this residual oil laden ballast water outside a harbor prior to docking for refilling with crude oil. This residual oil then pollutes the water. Also, in this procedure of pumping out the ballast water, there is a stage when with in-rushing air there is an explosive vaporous mixture in the tanks. These problems can be obviated by the use of the compositions of this invention. If after filling the tanks with ballast water to the desired level, any of the microorganism compositions of this invention, or mixtures, are added, the oil will be consumed producing carbon dioxide which is useful in inhibiting the formation of an explosive atmosphere during the procedure of pumping out of the ballast water. Further, there will be essentially no water pollution.

The following examples will aid in explaining, but should not be deemed as limiting, the instant invention. In all cases, unless otherwise noted, all parts and percentages are by weight.

EXAMPLE 1

A sample of pond water from the research laboratory site of W. R. Grace & Co., at Clarksville, Md., was covered with a layer of n-tetradecane. Over a period of days a thin intermediate layer formed between the water and hydrocarbon layers. The surviving organisms in the intermediate layer were cultured in nutrient agar media at 37° C. for a week. This nutrient agar solution comprises 3 g. beef extract, 5 g. peptone and 15 g. agar in 1000 g. of distilled water and adjusted to 6.8 to 7.0 pH.

EXAMPLE 2

A portion of the microorganisms from Example 1 are freeze-dried and admixed with vermiculite particles (Zonolite passed through a U.S. Series sieve size No. 40 and which has a bulk density of 45 lbs./ft.$^3$). Each type of microorganism obtained from Example 1 is freeze-dried and admixed with hydrophylic vermiculite. *Candida lipolytica* and *Pseudomonas fluorescens* cultures (purchased from American Type Culture Collection, 12301 Park Lawn Drive, Rockville, Md.) are freeze-dried and admixed with the vermiculite particles. Each culture is freeze-dried by placing about 5 ml. of the culture and 0.5 ml. of sterile skim milk in a Virtis Freeze Drying Cabinet, Model 2078, reducing the temperature to between 0° C. and minus 1° C., applying a vacuum of about 1μ which reduces the temperature to about minus 50° C. The temperature is maintained in the range of minus 5° C. to minus 50° C. until all the moisture is sublimed off, which is about 1 to 3 hours. The pressure is then raised to atmospheric pressure and the temperature is raised to room temperature.

Synthetic sea water is then prepared and placed in glass trays. Four sets of oil slicks are prepared by combining each of the following materials: West Texas crude oil (13 ml.), Esso motor oil (3 ml.), n-tetradecane (3 ml.) and n-pentane (3 ml.). A portion of the microorganism composition of Example 1 and the *Candida lipolytica*-vermiculite composition and *Pseudomonas fluorescens*-vermiculite composition are placed individually on each oil slick and combined on one oil slick. Extensive growth of the microorganisms on the oil had developed after twelve hours.

EXAMPLE 3

In this example, a series of microorganisms are admixed with microporous carriers and then freeze-dried. The admixing permits the microorganisms to be adsorbed on and within the microporous carrier. Admixing is by mild agitation for from 3 to 15 minutes of 5 g. of vermiculite, kaolin clay, or silica gel. During admixing, the pH is maintained between 5 and 8. This pasty mixture is then placed in the freeze-drying cabinet and the temperature lowered to minus 1° C. to minus 5° C. The pressure is then lowered to 1μ which drops the temperature to about minus 35° C. to minus 50° C. Freeze-drying is complete in 1 hour. The material is then adjusted to ambient conditions, but maintained in a desiccated atmosphere. Table III sets out a series of microorganisms, and the microporous carriers into which they were adsorbed on and into and freeze-dried. The gas oil, West Texas Devonian Gas Oil, 500–800° F. cut, is used to determine the effective digestion of oil. The degree of microorganism growth on the oil is determined by visual observation.

TABLE III

| Microorganism | Microporous carrier | Growth On oil film |
|---|---|---|
| *Candida lipolytica* | Hydrophillic vermiculite | Very good. |
| *Candida lipolytica* | Silica gel | Good. |
| *Candida lipolytica* | Hydrophillic silica gel | Very good. |
| *Pseudomonas fluorescens* | do | Good. |
| *Candida utilis* | Meta laolin | Do. |
| *Candida tropicalis* | Vermiculite | Do. |
| *Bacillus megaterium* | Hydrophillic vermiculite | Do. |
| *Bacillus megaterium* | do | Do. |
| *Bacillum amylobacter* | Vermiculite | Do. |
| *Pseudomonas natriegens* | Silica gel | Do. |

EXAMPLE 4

The series of microorganisms of Table III were freeze-dried from an admixture which also included skim milk in a concentration of 4 percent by weight of the microorganism concentration. The results were essentially the same as set out in Table III.

EXAMPLE 5

In this example, a series of microorganisms were admixed with one of the nutrient solutions of Table I and a microporous carrier, and freeze-dried. The admixing of the three components allows for both the nutrients and microorganism culture solution with 10 g. of nutrient solution and 5 g. of microporous carrier for from 3 to 15 minutes. This mixture is then placed in a freeze-dry cabinet and freeze-dried as in Example 4. Table IV sets out the microorganisms, microporous carrier, nutrient solution and the relative microorganism grown on the oil film.

TABLE IV

| Microorganism | Microporous carrier | Nutrient solution of Table I | Growth on oil film |
|---|---|---|---|
| *Candida lipolytica* | Vermiculite | Solution I | Very good. |
| *Candida lipolytica* | Hydrophyllic vermiculite | do | Do. |
| *Candida lipolytica* | Silica gel | Solution II | Good. |
| *Pseudomonas natriegens* | do | Solution I | Do. |
| *Bacillus subtilis* | Hydrophyllic silica gel | Solution II | Do. |
| *Micrococcus paraffinae* | Hydrophyllic vermiculite | Solution I | Very good. |
| *Pseudomonas fluorescens* | do | do | Good. |
| *Candida utilis* | do | Solution III | Very good. |
| *Bacterium aliphaticum* | Vermiculite | Solution II | Good. |
| *Candida tropicalis* | Meta kaolin | Solution I | Do. |

EXAMPLE 6

A series of microorganisms (259) were collected from oil and hydrocarbon rich environments such as soils around refineries and oil wells, and from the fuel tanks of aircraft and ground vehicles. These microorganisms, after being isolated, were screened for growth on n-decane, Decalin and naphthalene. These three hydrocarbons were chosen as typical of the classes of compounds found in crude oil. The five microorganisms which grew best on each hydrocarbon were selected for combined use to consume hydrocarbon and oil samples. These microorganisms are identified by genus and Sharpley culture number (Sharpley Laboratories, Inc., Fredericksburg, Va.) in Table V.

TABLE V

| Microorganism | Screening Hydrocarbon |
|---|---|
| SL–190 | n-Decane. |
| SL–463 (Achromobacter) | Do. |
| SL–511 | Do. |
| SL–525* | Do. |
| SL–545 (Nocardia) | Do. |
| SL–169 (*Bacillus subtilis*) | Decalin |

See footnotes at end of table.

TABLE V—Continued

| Microorganism: | Screening Hydrocarbon |
|---|---|
| SL–217 | Decalin. |
| SL–514 (Flavobacterium) | Do. |
| SL–520 (*Pseudomonas fluorescens*) | Do. |
| SL–525* | Do. |
| SL–235 | Naphthalene. |
| SL–252 (Achromobacter) | Do. |
| SL–260 (Bacillus) | Do. |
| SL–519 (Bacillus) | Do. |
| SL–559 (Nocardia) | Do. |

*Good growth on both n-decane and Decalin.

A portion of each of the microorganisms of Table V were separately admixed with vermiculite by mechanical stirring and freeze-dried using the same procedure of Example 3. Another portion of each of the microorganisms in Table V, and a portion of *Candida lipolytica*, were admixed first with each other, and then with vermiculite (designated G–10). Admixing is by mechanical stirring. This microorganism mixture composite is freeze-dried using the same procedure as Example 3. Table VI sets out the growth on and dissipation of an oil mixture using the microorganisms which have been adsorbed in and on vermiculite singly and freeze-dried, and the microorganism mixture adsorbed in an on the vermiculite and freeze-dried.

TABLE VI

| Microorganism: | Growth on Oil Film |
|---|---|
| SL–190 | Good. |
| SL–463 | Do. |
| SL–511 | Do. |
| SL–525 | Do. |
| SL–545 | Do. |
| SL–169 | Do. |
| SL–217 | Do. |
| SL–514 | Do. |
| SL–520 | Do. |
| SL–235 | Do. |
| SL–252 | Do. |
| SL–260 | Do. |
| SL–519 | Do. |
| SL–559 | Do. |
| G–10 | Excellent. |

The combined microorganism mixture gives the best results for oil film dissipation.

EXAMPLE 7

A portion of the microorganisms designated G–10 in Example 7 are admixed together along with a silica gel carrier. Admixing is by mild stirring for 15 minutes. This composite of microorganism culture adsorbed into and on the silica gel is then freeze-dried using a Virtis Freeze Drying Cabinet, Model 2078. This freeze-dried composite is then placed on an oil slick (West Texas Devonian Gas Oil) produced on the lake at the Washington Research Center of W. R. Grace & Co. The slick, along with lake bank staining from the slick, was mostly dissipated within one week, with no traces left after 2½ weeks.

EXAMPLE 8

The tank of an oil tanker was simulated by filling a 50 gallon tank with synthetic sea water (salt water solution). On top of this seawater an oil layer of West Texas Devonian Gas Oil was placed to a depth of ¼ inch. A portion of the microorganism composite of Example 7 was placed on the oil film. The tank was sealed except for a vent pipe. There was good microorganism growth on the oil layer, and the oil layer was substantially dissipated in two weeks.

What is claimed is:

1. The method of removing oils and hydrocarbons from the surface of a body of water comprising dispersing a freeze-dried hydrocarbon consuming microorganism composition comprising microorganisms adsorbed within an inorganic microporous carrier onto said oils and hydrocarbons, said surface having water and moisture present whereby said microorganism composition is activated, and allowing said microorganism composition to remain in contact with said oils and hydrocarbons whereby the microorganisms in said composition digest and remove the oils and hydrocarbons.

2. The method of Claim 1 wherein said freeze-dried microorganism composition consists essentially of a freeze-dried composite of microorganisms within a microporous carrier.

3. The method of Claim 1 wherein said freeze-dried microorganism composition consists essentially of a freeze-dried composite of microrganisms and nutrients within a microporous carrier.

4. The method of Claim 1 wherein said dispersing is by pneumatically spraying as a gas-solid microorganism composition mixture.

5. The method of Claim 1 wherein said dispersing is by hydraulically spraying as a liquid-solid microorganism composition mixture.

6. The method of Claim 1 wherein said dispersing is by an explosive charge.

7. The method of Claim 1 wherein said oils and hydrocarbons are on an open water surface.

8. The method of Claim 1 wherein said oils and hydrocarbons are on a contained water surface.

9. The method of Claim 8 wherein said oils and hydrocarbons on the contained water surface are within the tanks of an oil tanker ship.

10. A method of eliminating a hydrocarbon contaminant film from the surface of a body of water, comprising the step of distributing a bacteria strain consisting essentially of a strain selected from the group consisting of *Pseudomonas fluorescens* and *Pseudomonas aeruganosa* on the hydrocarbon film, said bacteria being present in a concentration sufficient to metabolize the hydrocarbon to produce non-contaminating water soluble products.

References Cited
UNITED STATES PATENTS

| | | | |
|---|---|---|---|
| 3,616,204 | 10/1971 | Linn | 195—3 H |
| 2,742,398 | 4/1956 | ZoBell | 195—3 H |
| 3,185,216 | 5/1965 | Hitzman | 195—3 H |
| 3,013,946 | 12/1961 | Lumb et al. | 195—116 X |
| 3,769,164 | 10/1973 | Azarowicz | 210—11 |
| 3,105,014 | 9/1963 | Harrison | 210—2 X |
| 3,152,938 | 10/1964 | Davis et al. | 210—11 |

FOREIGN PATENTS

| | | | |
|---|---|---|---|
| 953,414 | 3/1964 | Great Britain | 195—116 |

OTHER REFERENCES

"Combating Pollution Created by Oil Spills," Vol. I Methods, Arthur D. Little, Inc., AD 696—635, June 30, 1969, U.S. Dept. Commerce/National Bureau of Standards, pp. 87–94, 104–106.

THOMAS G. WYSE, Primary Examiner

U.S. Cl. X.R.

210—DIG. 21; 195—3 H